(12) United States Patent
Gwalani

(10) Patent No.: US 12,247,691 B2
(45) Date of Patent: Mar. 11, 2025

(54) MULTI-DIRECTIONAL TRIPOD

(71) Applicant: FREEWELL INDUSTRY COMPANY LIMITED, Hong Kong (HK)

(72) Inventor: Hitesh Gopal Gwalani, Nagpur (IN)

(73) Assignee: FREEWELL INDUSTRY COMPANY LIMITED, Hong Kong (HK)

( * ) Notice: Subject to any disclaimer, the term of this patent is extended or adjusted under 35 U.S.C. 154(b) by 0 days.

(21) Appl. No.: 18/359,917

(22) Filed: Jul. 27, 2023

(65) Prior Publication Data

US 2025/0035255 A1    Jan. 30, 2025

(51) Int. Cl.
*F16M 11/12* (2006.01)
*F16M 11/24* (2006.01)

(52) U.S. Cl.
CPC ......... *F16M 11/123* (2013.01); *F16M 11/242* (2013.01)

(58) Field of Classification Search
CPC .... F16M 11/123; F16M 11/242; F16M 11/12; F16M 11/125; F16M 11/126; F16M 11/128; F16M 11/04; F16M 11/2035; F16M 11/2042; F16M 11/205; F16M 11/2057; F16M 11/2064; F16M 11/2071; F16M 11/02; G03B 17/561
USPC ..................................................... 248/122.1
See application file for complete search history.

(56) References Cited

U.S. PATENT DOCUMENTS

| | | | | |
|---|---|---|---|---|
| 3,240,140 A | * | 3/1966 | Hearon | G03B 37/02 396/24 |
| 2004/0061035 A1 | * | 4/2004 | Nakatani | F16M 13/00 248/278.1 |
| 2011/0006170 A1 | * | 1/2011 | Liu | F16M 11/041 248/371 |
| 2011/0188847 A1 | * | 8/2011 | McKay | F16M 11/38 396/421 |
| 2019/0368653 A1 | * | 12/2019 | Olinger | F16M 11/041 |
| 2021/0332937 A1 | * | 10/2021 | Li | F16M 11/16 |
| 2022/0003357 A1 | * | 1/2022 | Liu | F16M 11/123 |
| 2022/0191358 A1 | * | 6/2022 | Akulshin | G06N 20/00 |
| 2024/0052967 A1 | * | 2/2024 | Pan | F16M 11/10 |

* cited by examiner

*Primary Examiner* — Christopher Garft

(57) ABSTRACT

The utility model discloses a multi-directional tripod, comprising a rotating connected gimbal assembly, a support foot assembly, a gimbal assembly comprising a gimbal and a turntable that can be rotated relatively. An external screw is provided on the turntable for connecting a camera, mobile phone clip, etc., to realize the horizontal 360° rotation adjustment function of the shooting equipment. The gimbal assembly is connected with the support foot assembly through a ratchet assembly. The vertical direction of the gimbal is adjusted 180° to realize free switching of horizontal and vertical shooting. The support foot assembly is provided with at least one pin assembly, wherein each of the pin assembly realizes the 90° folding of a first support foot and a second support foot, realize the two-hand holding operation, etc. The disclosed multi-directional tripod offers light and a portable structure with rich product functions.

19 Claims, 10 Drawing Sheets

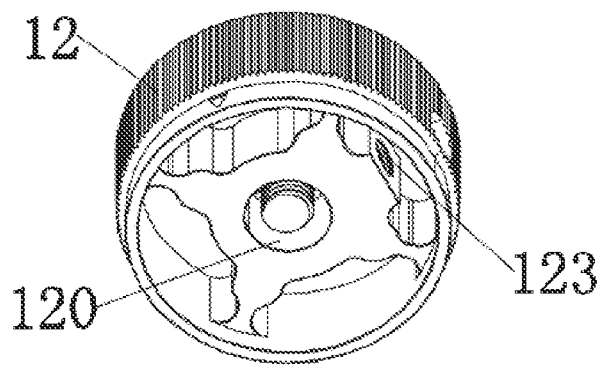
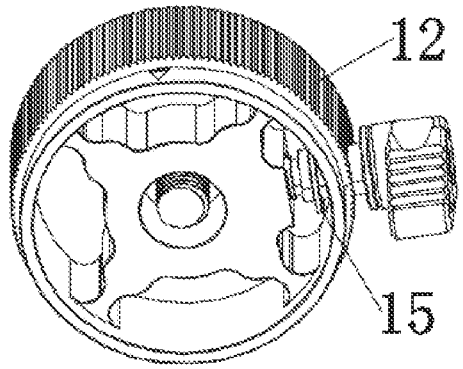
FIG. 4A　　　　　　　　FIG. 4B
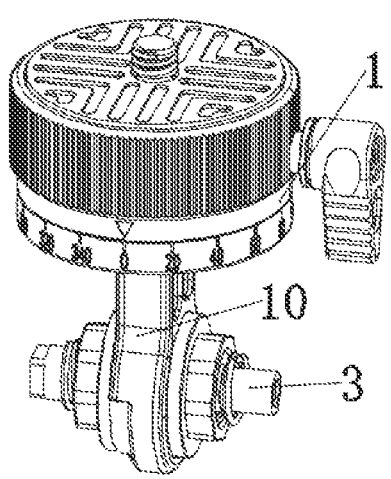
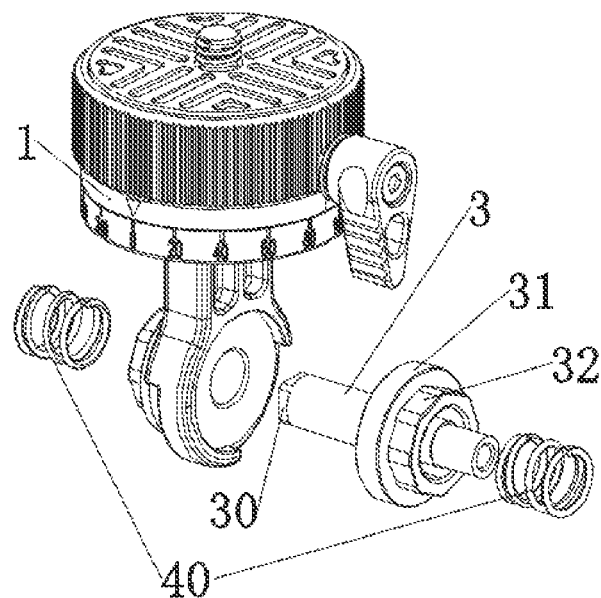
FIG. 5A　　　　　　　　FIG. 5B

MULTI-DIRECTIONAL TRIPOD

FIELD OF THE INVENTION

This application relates generally to the field of photography and video equipment. More particularly, the proposed technology relates to a multi-directional tripod.

BRIEF STATEMENT OF THE PRIOR ART

Tripods have long been utilized in the field of photography and videography to provide stability and support for cameras. Traditional tripods typically consist of three legs connected to a central mounting plate or head, allowing the camera to be securely attached. While these tripods offer stability, they often limit the range of motion and adjustability of the camera.

In recent years, there have been advancements in tripod design to address the limitations of traditional tripods. For example, some tripods have incorporated ball heads or fluid heads, allowing for smoother and more precise movements. However, these solutions still provide limited flexibility in terms of capturing shots from different angles or heights.

Additionally, there are tripods available that allow for height adjustments or rotation along a single axis. However, these tripods lack the ability to provide simultaneous adjustments along multiple axes or directions. As a result, photographers and videographers often need to switch between different tripods or adjust the position of the tripod itself to achieve the desired camera angle or composition.

There is a need, therefore, for a multi-directional tripod that provides enhanced stability and versatility, allowing for simultaneous adjustments in multiple axes or directions. Such a tripod would enable photographers and videographers to capture shots from various angles, heights, and orientations without the need for frequent repositioning of the tripod.

SUMMARY OF THE INVENTION

In an embodiment, a multi-directional tripod is disclosed. The multi-directional tripod comprises of a gimbal assembly 1 and a support foot assembly 2. The gimbal assembly 1 and the support foot assembly 2 are configured to rotate relative to one another. The gimbal assembly 1 comprises of a gimbal 10. A bottom portion of the gimbal 10 defines a through hole 102, wherein the through hole 102 receives a shaft 3. The shaft 3 is configured to rotate along a circumference of the shaft 3. The shaft 3 is connected with a support foot assembly 2. A top surface of the gimbal 10 comprises of a hinge 100. An upper end of the hinge 100 comprises a threaded hole. The gimbal 10 is configured to receive a turntable 12, wherein the turntable 12 defines a shaft hole 120, wherein the shaft hole extends from a center of the turntable 12. A top surface of the turntable 12 defines a limit slot 121 and a mounting slot 122. An upper part of the limit slot 121 is provided with a mounting screw 11, wherein the mounting screw 11 is threaded through the limit slot 121 and the hinge 100. The limit slot 121 receives at least a portion of a head of the mounting screw 11. The mounting slot 122 defines at least one threaded hole. The mounting slot 122 is configured to receive at least one mounting plate 130 connected to an external screw 13, wherein the mounting plate 130 defines at least one hole. The at least one hole corresponds to the at least one threaded hole defined in the mounting slot 122. The mounting plate 130 is fixed in the mounting slot 122 by at least one first screw. The external screw 13 is covered with an anti-slip pad 16, wherein a bottom surface of the non-slip mat 16 is bonded with the top surface of the turntable 12.

BRIEF DESCRIPTION OF DRAWINGS

Embodiments are illustrated by way of example and not limitation in the figures of the accompanying drawings, in which like references indicate similar elements and in which:

FIGS. 4A and 4B are a schematic diagram of a bottom portion of a turntable 12, in accordance with an embodiment.

FIGS. 5A and 5B are a schematic diagram of a connection between a gimbal assembly 1 and a shaft 3, in accordance with an embodiment.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1:
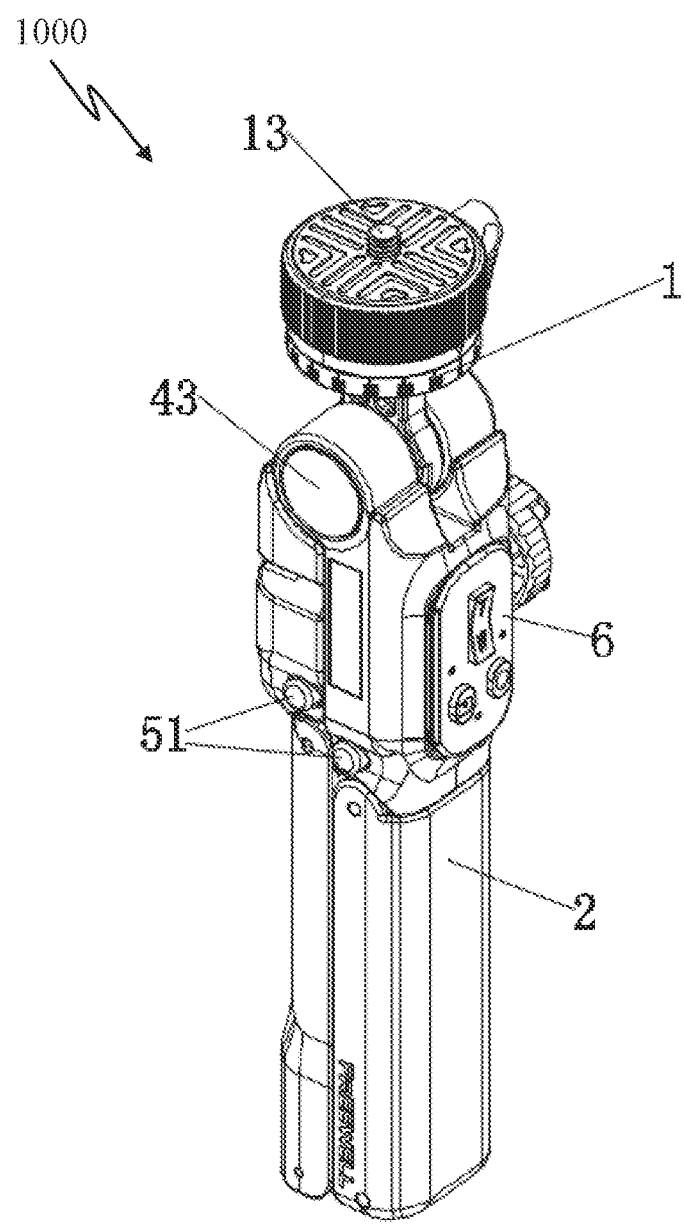
FIG. 1 illustrates a multi-directional tripod 1000, in accordance with an embodiment.
Figure 2:
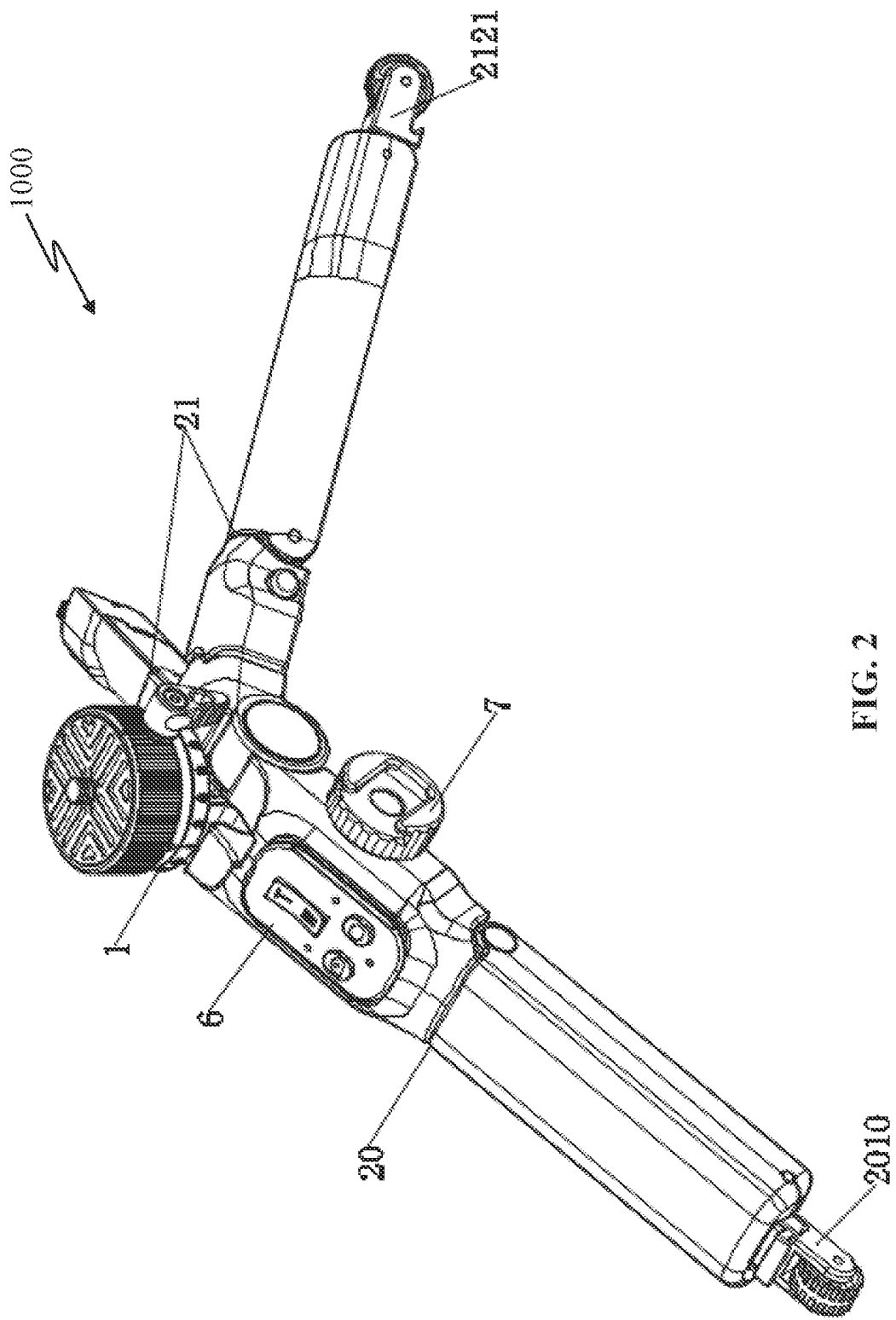
FIG. 2 illustrates the multi-directional tripod 1000 in a first used state, in accordance with an embodiment.

FIG. 1 illustrates a multi-directional tripod 1000, in accordance with an embodiment. The multi-directional tripod 1000 may comprise of a gimbal assembly 1 and a support foot assembly 2. The gimbal assembly 1 and the support foot assembly 2 may be rotatably connected. FIG. 2 illustrates the multi-directional tripod in a first used state, in accordance with an embodiment.

Figure 3:
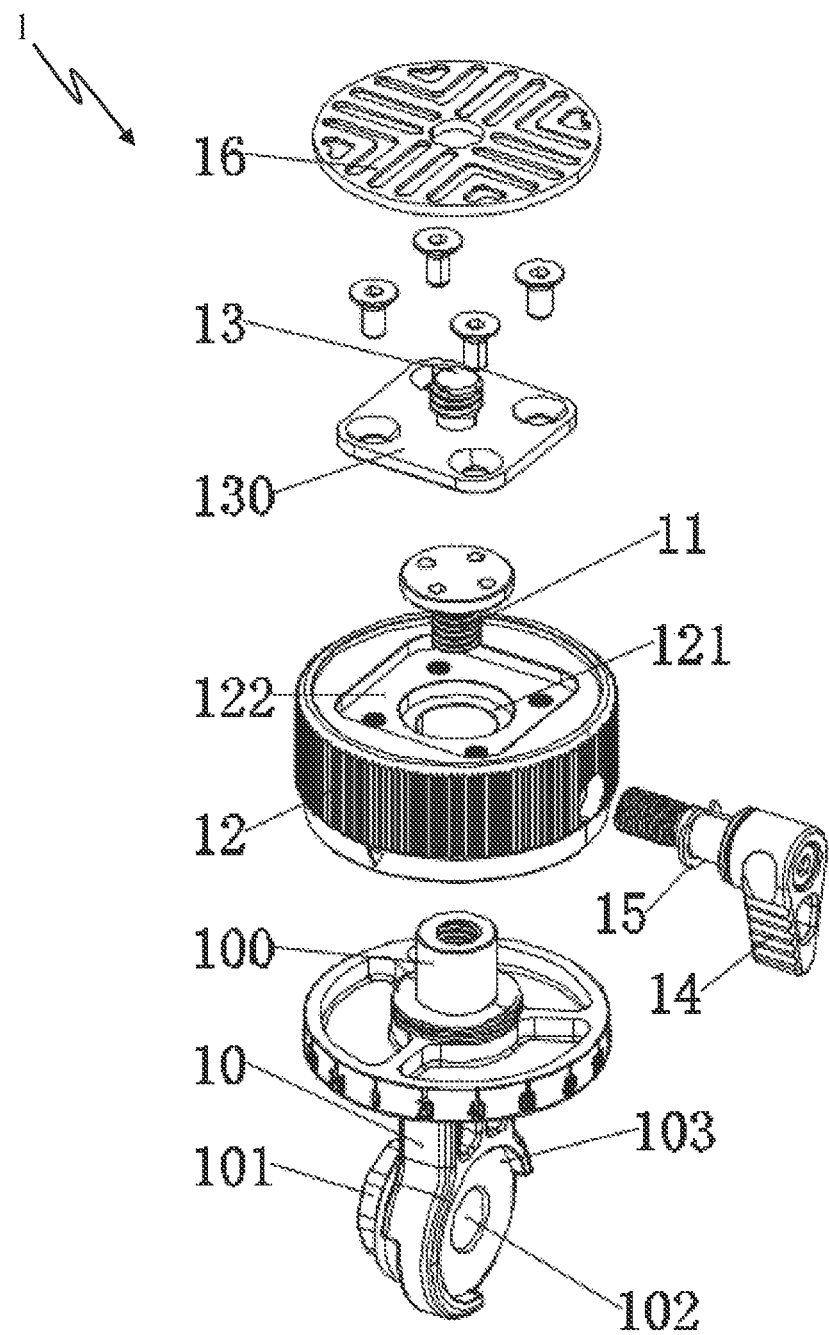
FIG. 3 is an exploded schematic diagram of a gimbal assembly 1, in accordance with an embodiment.

Referring to FIGS. 1 and 3, the gimbal assembly 1 may comprise of a gimbal 10. The gimbal 10 may comprise of a top portion and a bottom portion. A through hole 102 may be defined towards the bottom portion of the gimbal 10. The through hole 102 may be configured to receive a shaft 3 (refer FIG. 5). The shaft 3 may be configured to rotate along a circumference of the shaft 3. The shaft 3 may be connected to the support foot assembly 2 enabling the rotation of the support foot assembly 2 with respect to the gimbal assembly 1. The top portion of the gimbal 10 may comprise of a hinge 100 with a threaded hole.

In an embodiment, the gimbal assembly 1 may comprise of a turntable 12. The turntable 12 may comprise of a top surface and a bottom surface. The bottom surface of the turntable 12 may define a shaft hole 120 extending along a center of the turntable 12, wherein a diameter of the shaft hole 120 is greater than a diameter of the hinge 100. The shaft hole 120 may be configured to receive the hinge 100, wherein the turntable 12 may be configured to rotate along the hinge 100. The top surface of the turntable 12 may define a limit slot 121 and a mounting slot 122. The mounting slot 122 may be defined over the limit slot 121. The hinge 100 may be configured to receive a mounting screw 11 through the limit slot 121 to realize the rotational connection between the gimbal 10 and the turntable 12.

In an embodiment, the mounting slot 122 may comprise of at least one threaded hole. Further, the gimbal assembly 1 may comprise of a mounting plate 130 with an external screw 13, on a top portion of the mounting plate 130, protruding away from the turntable 12. The mounting plate 130 may define at least one plate hole. Each of the at least one plate hole and the at least one threaded hole may be aligned. Each of the at least one threaded hole may be configured to receive a first screw, when the mounting plate 130 is fixed to the turntable 12 in an assembled position.

In an embodiment, the external screw 13 may adopt a ¼-20 screw which may be used to connect, but not limited to, a camera, other gimbal components, mobile phone clips and other shooting equipment.

In an embodiment, the top portion of the mounting plate 130 may be configured to receive an anti-slip pad 16. Further, the anti-slip pad 16 may be glued to the top surface of the turntable 12.

Referring to FIGS. 3 and 4, a threaded through hole 123 may be defined from the shaft hole 120 to a sidewall of the turntable 12. The threaded through hole 123 may be configured to receive a wrench 14, wherein the wrench 14 may comprise of a threaded column configured to connect to the threaded portion of the threaded through hole 123. The wrench 14 is configured to move laterally upon twisting.

In an embodiment, the wrench 14 may be rotated to make contact with the hinge 100. Upon contact, the wrench 14 may restrict the turntable 12 from rotating relative the gimbal 10.

In an embodiment, a limiter circlip 15 may be connected to the wrench 14. The limiter circlip 15 may be located between the sidewall of the turntable 12 and the shaft hole 120. The limiter circlip 15 may be configured to prevent the wrench 14 from disengaging from the turntable 12.

In an embodiment, the bottom portion of the gimbal 10 may be provided with a first limit block 101. A rotatory limit grove 103 may be provided on a side away from the first limit block 101.

Referring to FIG. 5, in accordance with an embodiment, the shaft 3 may comprise of a first end and a second end. The shaft 3 may be provided with a square limit block 30 at the first end. The first and second ends of the shaft 3 may define threaded holes. The shaft 3 may be provided with a rotary block 31 disposed towards the second end of the shaft 3. A second limit block 32 may be disposed next to the rotary block 31 towards the second end of the shaft 3. The shaft 3 may pass through the through hole 102, and the rotary block 31 may be configured to contact the rotatory limit grove 103.

Figure 6:
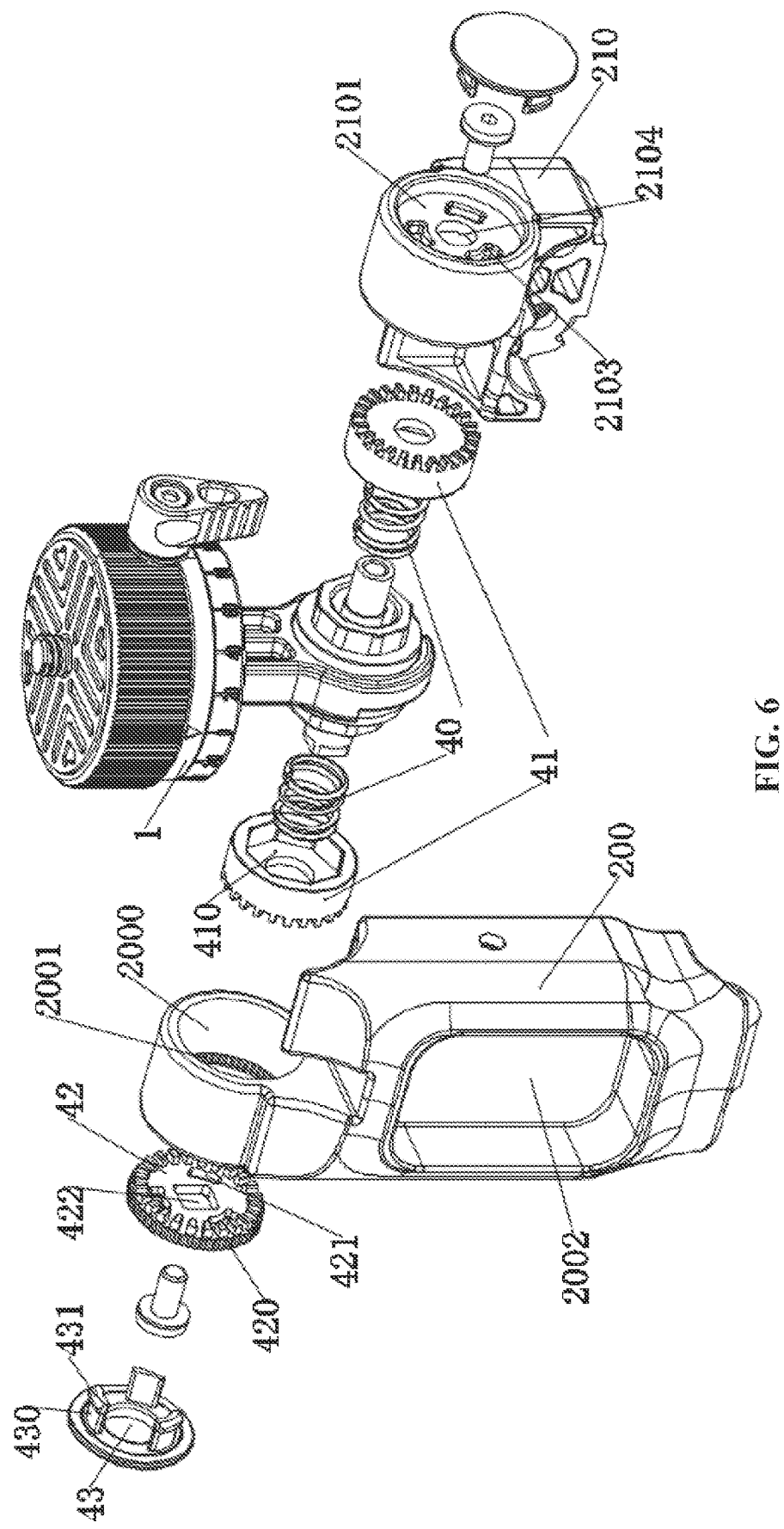
FIG. 6 is an exploded schematic diagram of a ratchet assembly from a first direction, in accordance with an embodiment.
Figure 7:
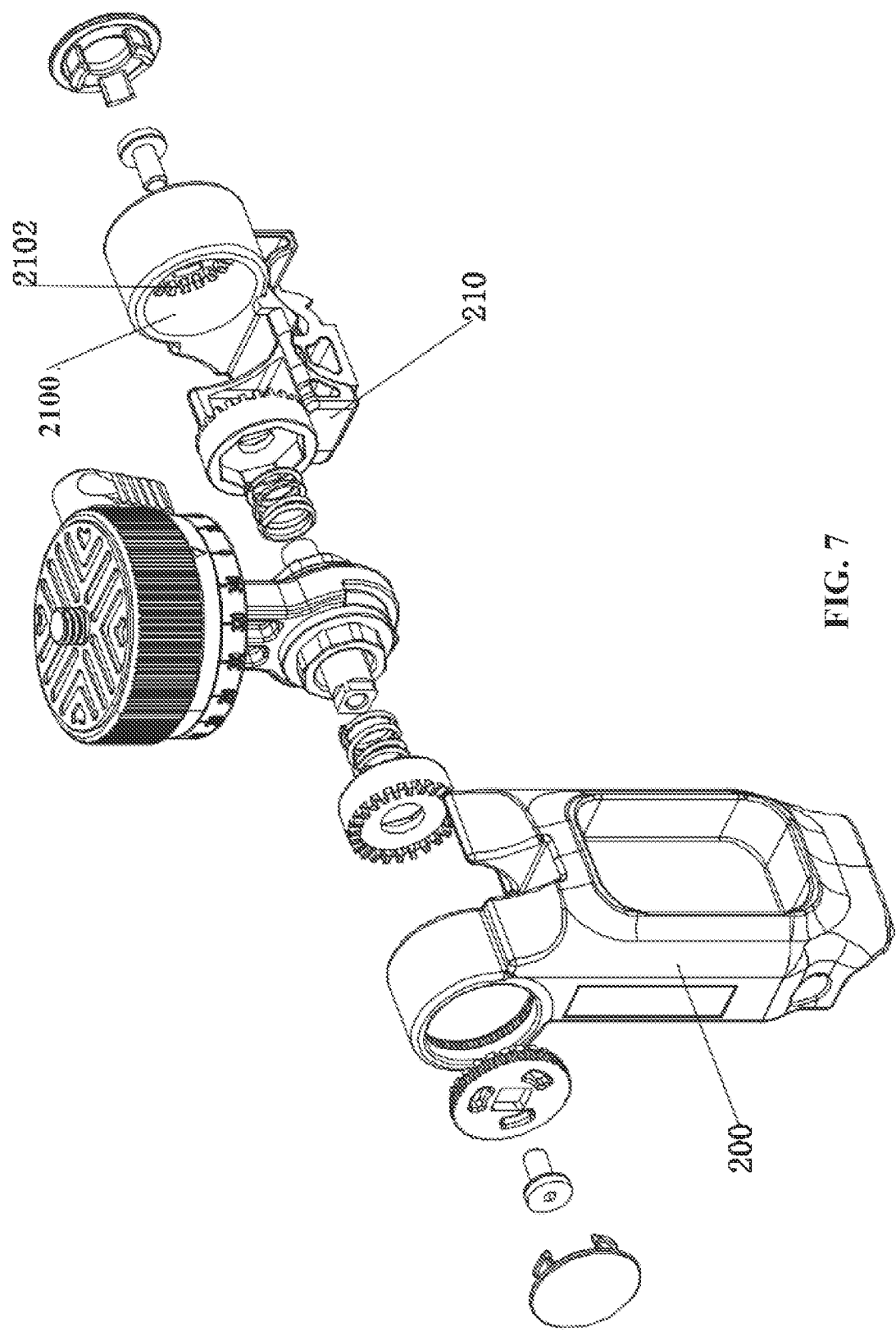
FIG. 7 is an exploded schematic diagram of the ratchet assembly from a second direction, in accordance with an embodiment.

Referring to FIGS. 2, 6, and 7, the support foot assembly 2 may comprise of a first support foot 20 and plurality of second support feet 21, wherein each of the plurality of second support feet 21 are mirror-symmetrical structures. The first support foot 20 may comprise of a first bracket 200, wherein the first bracket 200 defines a first mounting cavity 2000 towards a top end of the first bracket 200. The first mounting cavity 2000 may be a hollow cylindrical structure.

In an embodiment, the plurality of second support feet 21 may be comprise of a second bracket 210. The second bracket 210 may comprise of a second mounting cavity 2100 towards a top end of the second bracket 210. A fixed plate 2101 may be disposed inside the second mounting cavity 2100, wherein the fixed plate 2101 may be provided with a fixed ratchet 2102 on a side facing towards the shaft 3. The fixed plate 2101 may define at least one first gap 2103 and a second gap 2104, wherein the second gap 2104 may extend radially outwards from a center of the fixed plate 2101. The at least one first gap 2103 may be defined between the second gap 2104 and a circumference of the fixed plate 2101. The at least one first gap 2103 may be any shape, such as but not limited to circular, square, oval, and hexagonal.

In an embodiment, the support foot assembly 2 may comprise of a rachet assembly. The rachet assembly may comprise of two return springs 40 disposed on the first end and the second end of the shaft 3 and two movable ratchets 41 disposed next to the each of the two return springs 40 towards an end away from the through hole 102. The two movable ratchets 41 may define a central space, wherein an inner diameter of the central space is less than an outer diameter of the two return springs 40 and the inner diameter of the central space is greater than an outer diameter of the shaft 3.

In an embodiment, the at least one ratchet from the two movable ratchets 41 disposed towards the first end of the shaft 3 may define a limited block groove 410. The limited block groove 410 may be adapted to the first limit block 101 and the second limit block 32. The first limit block 101 and the second limit block 32 may be equal polygonal blocks, or elliptical blocks. The first limit block 101 and the second limit block 32 are placed in the respective limit block groove 410.

In an embodiment, an inner wall of the first mounting cavity 2000 is provided with a cogging groove 2001. The cogging groove 2001 may be configured to receive a ratchet block 42. The ratchet block 42 may be provided with a plurality of locating teeth 420, wherein the plurality of locating teeth 420 are adapted to the cogging groove 2001. A square limit groove 422 is defined from a center of the ratchet block 42 extending towards a circumference of the ratchet block 42. At least one third gap 421 may be defined, on the ratchet block 42, between the square limit groove 422 and the plurality of locating teeth 420.

In an embodiment, the square limit groove 422 may be adapted to and may further be configured to receive the square limit block 30 through the at least one movable ratchet from the two movable ratchets 41. A second screw may be connected to the first end of the shaft 3, wherein the head of the second screw is bigger than the square limit groove 422.

In an embodiment, in the first mounting cavity 2000, at least one movable ratchet from the two movable ratchets 41 may be snapped with the ratchet block 42 under the action of the at least one return spring among the two return springs 40.

In an embodiment, in the second mounting cavity 2100, the second end of the shaft 3 may be passed through the other ratchet from the two movable ratchets 41 and may be plugged into the second gap 2104 of the fixed plate 2101. A third screw may be connected to the second end of the shaft 3, wherein the head of the third screw is bigger than the second gap 2104. Further, the other ratchet from the two movable ratchets 41 may be configured to snap fit with the fixed ratchet 2102 under the action of the at least one return spring among the two return springs 40.

In an embodiment, a plurality of bracket buttons 43 may be disposed on the outside of the first mounting cavity 2000 and the second mounting cavity 2100. Each of the plurality of bracket buttons 43 may comprise of at least one pressure plate 430, protruding on one side, facing the first mounting cavity 2000 and the second mounting cavity 2100. A clamp block 431, a protrusion, is provided at one end of the pressure plate 430. Each of the at least one first gap 2103 and the at least one third gap 421 may be configured to receive at least one pressure plate 430 and be realized in a snap fit manner.

In an embodiment, by pressing the plurality of bracket buttons 43, the two movable ratchets 41 move away from the plurality of locating teeth 420 and the fixed ratchet 2102, thereby, enabling the vertical and horizontal rotation of the gimbal assembly 1.

Figure 8:
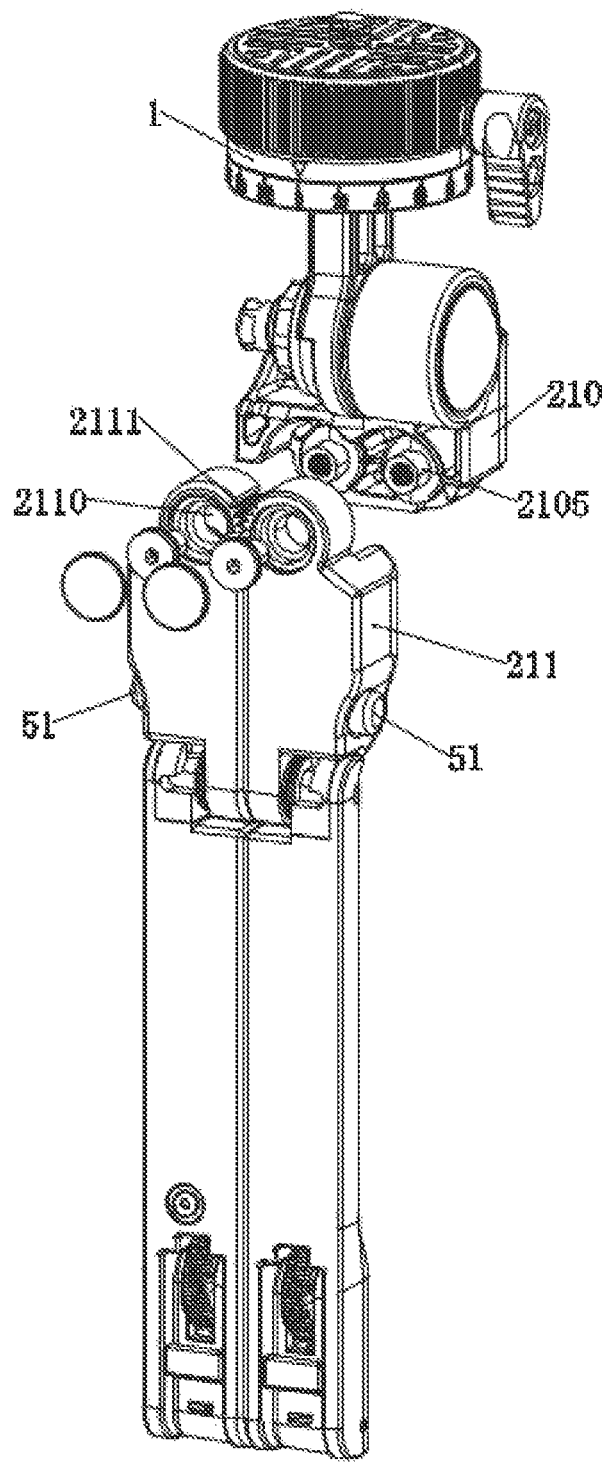
FIG. 8 is a schematic diagram of a connection between a second bracket 210 and a plurality of second support feet 21, in accordance with an embodiment.
Figure 9:
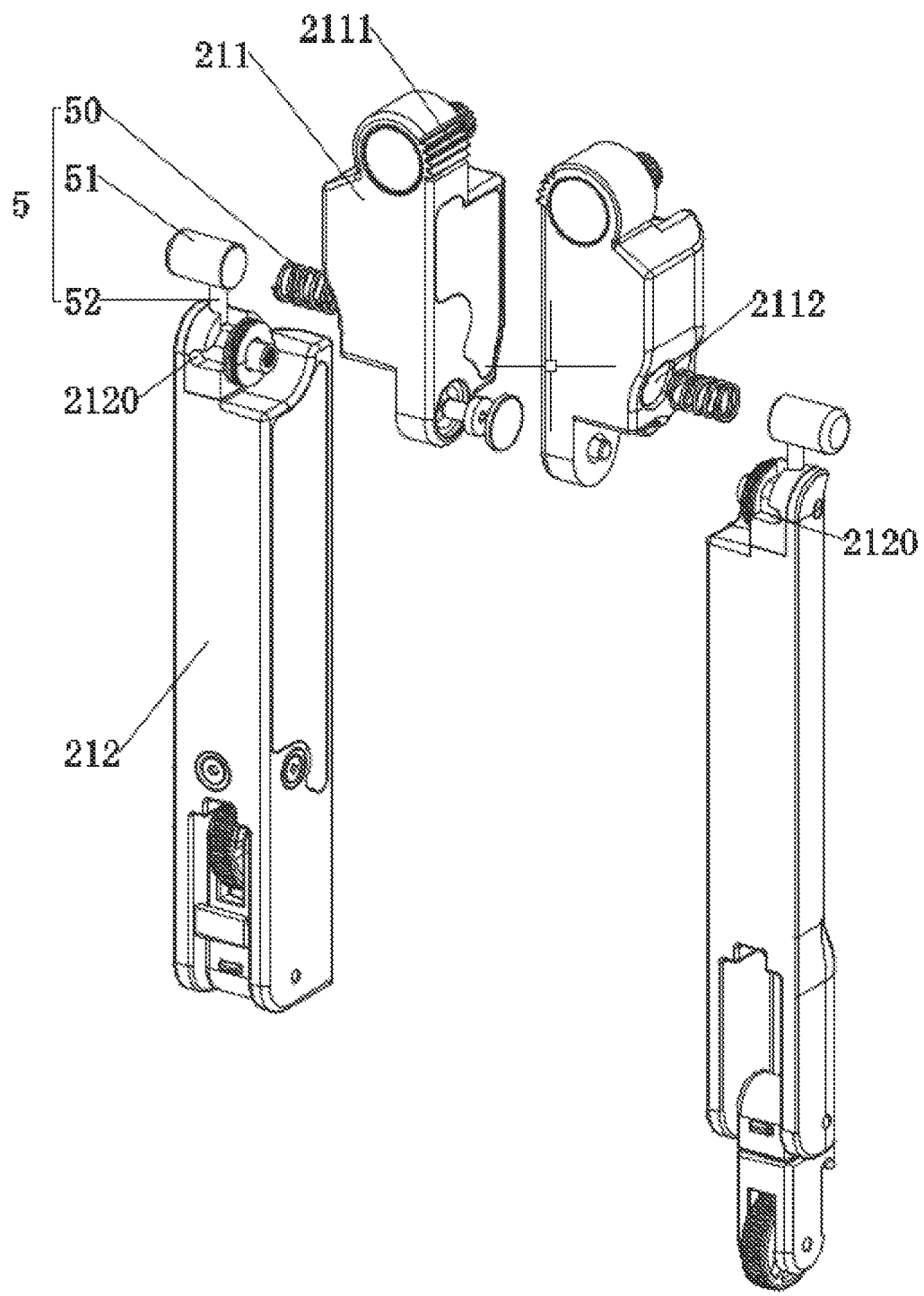
FIG. 9 is a schematic diagram of a pin assembly 5, in accordance with an embodiment.
Figure 10:
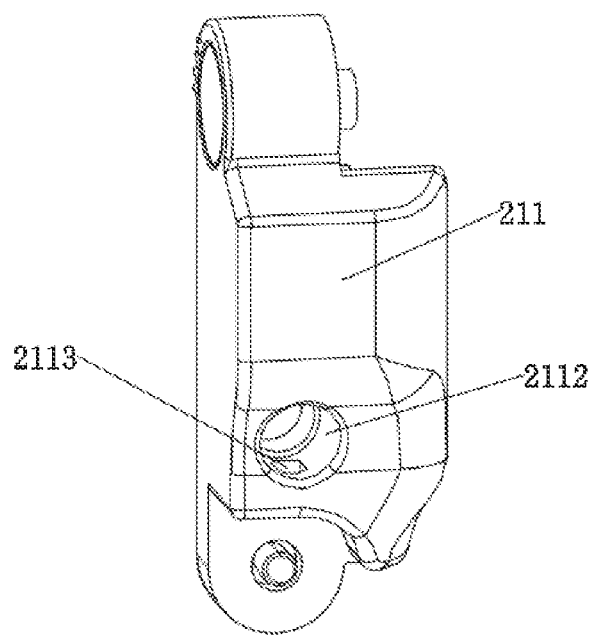
FIG. 10 is a schematic diagram of the connecting seat 211, in accordance with an embodiment.
Figure 11A:
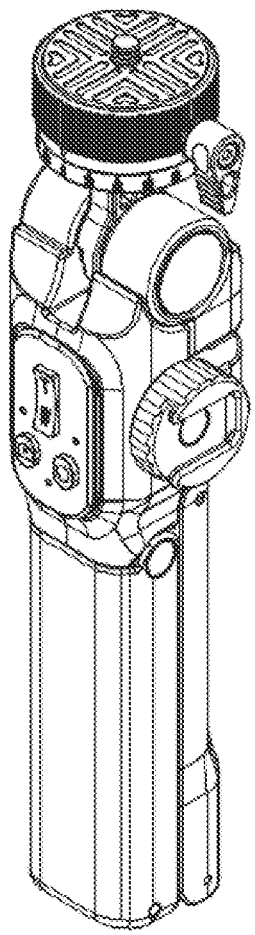
FIGS. 11A, 11B, and 11C illustrate the multi-directional tripod 1000 in a second, third, and fourth used state, in accordance with an embodiment.
Figure 11B:
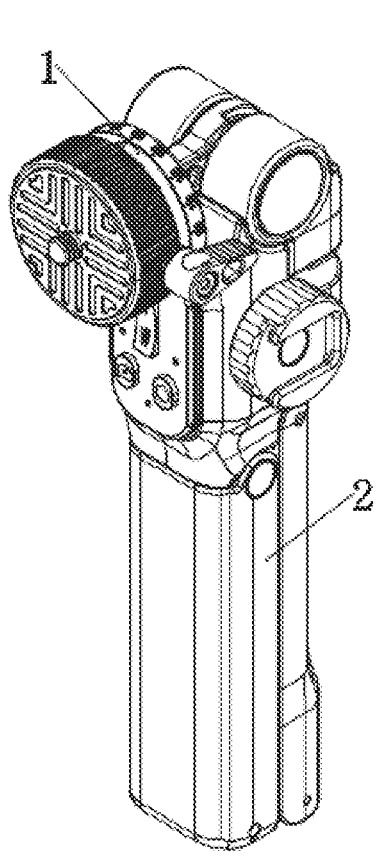
Figure 11C:
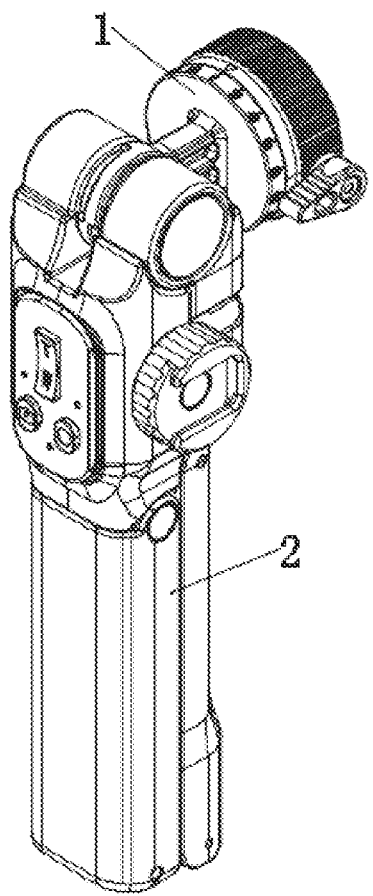

Referring to FIGS. 8, 9, and 10, two fixed shafts 2105, with threaded holes, may be disposed below the second bracket 210. Further, each of the plurality of second support feet 21 may be provided with a connecting seat 211. A socket hole 2110 is defined on a top end of the connecting seat 211. The socket hole 2110 may be configured to receive the fixed shaft 2105. The threaded holes of the two fixed shafts 2105 may receive a fourth screw to fixedly attach the socket hole 2110 to the fixed shaft 2105. Each of the socket holes 2110 may comprise of a meshing teeth 2111, wherein the meshing teeth 2111 may be disposed on an outside surface of each of the socket holes 2110. The meshing teeth 2111 of one of the plurality of second support feet 21 may be configured to engage with the meshing teeth 2111 of the other second support feet 21, thereby, allowing the two feet among the plurality of second support feet 21 to move away or closer from each other at the same time, thus, enabling the multi-directional tripod 1000 to form a triangular support structure.

Figure 12:
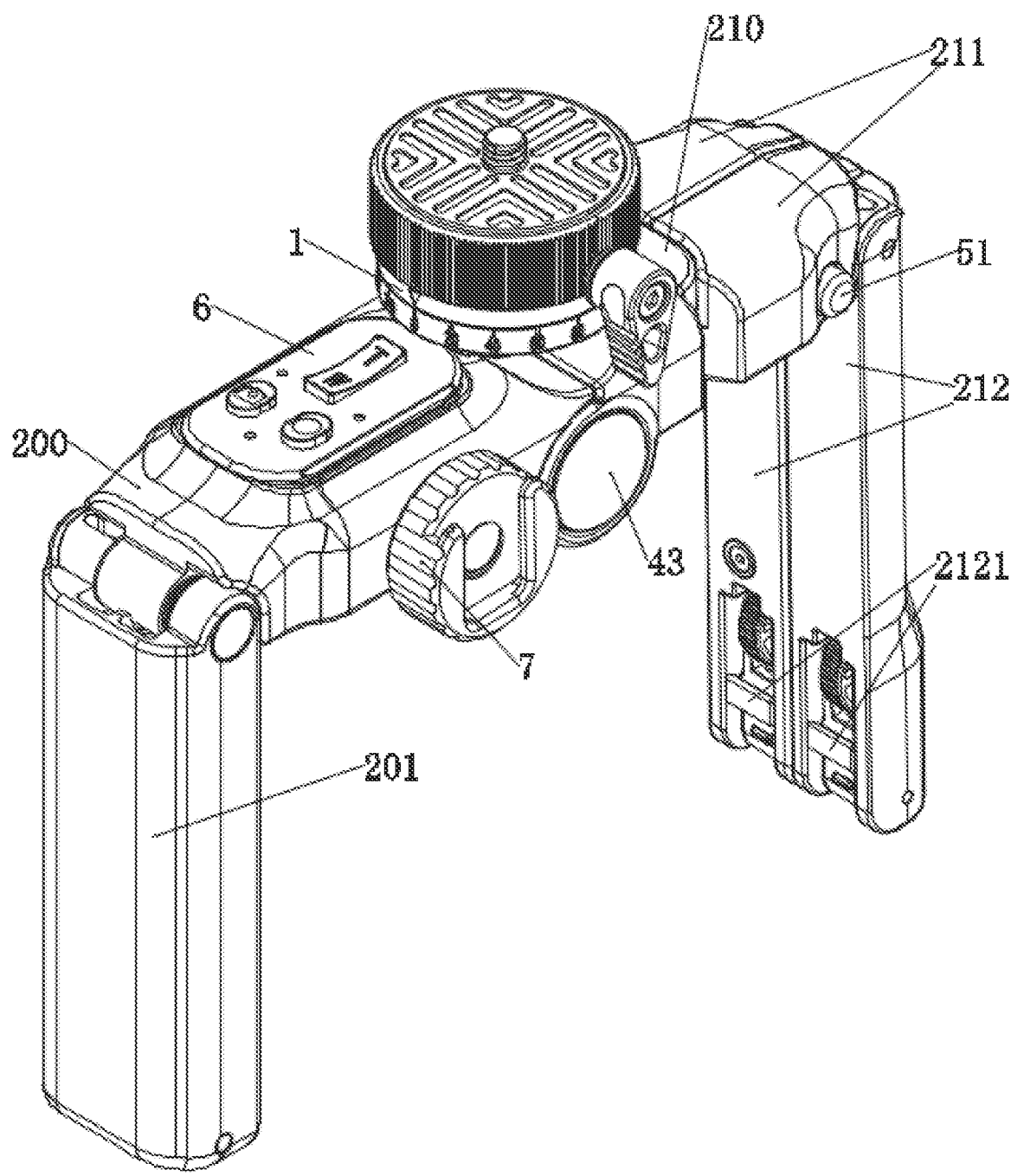
FIG. 12 illustrates the multi-directional tripod 1000 in a fifth used state, in accordance with an embodiment.

Referring to FIG. 12, the first support foot 20 comprises a first handle 201. The first handle 201 is rotatably connected to the first bracket 200. Each of the plurality of second support feet 21 comprises a second handle 212, wherein the second handle 212 is rotatably connected to the connecting seat 211.

Referring to FIGS. 1, 9 and 12, the first handle 210 and the first bracket 200 are connected by at least one pin assembly 5. Similarly, the second handle 212 and the connection seat 211 are connected by another of the at least one pin assembly 5. Each of the at least one pin assembly 5 may comprise of a latch 52, folding button 51, and a snap spring 50. A connected card slot 2120 may be defined on a portion of the first handle 201 and on a portion of each of the second handles 212. The connected card slot 2120 may be defined vertically and horizontally. A bottom side of the first bracket 200 and a bottom side of the connecting seat 211 may define a counterbore 2112. Further, the counterbore 2112 may define a waist hole 2113, wherein the waist hole 2113 may be extending downward and perpendicular to the axis passing through a center of the counterbore 2112. The snap spring 50 is disposed inside the counterbore 2112. One end of the latch 52 is disposed inside the connected card slot 2120 and the other end is fixed to the folding button 51. The folding button 51 may be inserted into the counterbore 2112 pressing against the snap spring 50. The folding button 51 comprises a protrusion, wherein the protrusion may be configured to go into the waist hole 2113.

In an embodiment, pressing the folding button 51 may squeeze the snap spring 50 to release the latch 52 from the vertical card slot 2120. Turning the first handle 201 and the two second handles 212 by 90° may release the folding button 51 and the snap spring 50 may push the latch 52 into the horizontal card slot 2120 to realize the tripod two-hand grip operation.

Referring to FIGS. 2 and 12, a bottom portion of the first handle 201 may be connected to a first universal wheel 2010. A bottom portion of the second handle 212 may be connected to a second universal wheel 2121. The first universal wheel 2010 and the second universal wheel 2121 may be rotatably connected to the first handle 201 and the second handle 212 respectively, wherein, the first universal wheel 2010 and the second universal wheel 2121 may be connected to a rod, wherein the rod is allowed to rotate at least 180°, thereby enabling the first universal wheel 2010 and the second universal wheel 2121 to stay hidden within the first handle 201 and the second handle 212. The rod may be configured to pop-up out, thereby exposing the first universal wheel 2010 and the second universal wheel 2121. This disclosed configuration allows the user to shoot a 360° view.

In an embodiment, a bottom portion of the turntable 12 comprises a triangular indicator marker, wherein the triangular indicator marker acts as a digital identification to facilitate observation and adjustment of the horizontal rotation angle. (Please refer FIGS. 1, 3, and 5)

Referring to FIGS. 1, 2, and 6, the first bracket 200 may be provided with a magnetic groove 2002. An inner wall of the magnetic groove 2002 may comprise of a magnetic block. The magnetic groove 2002 may be connected to a Bluetooth controller 6. The Bluetooth controller 6 may also be provided with a magnetic block inside. The Bluetooth controller 6 is an existing technology, which can realize a Bluetooth connection with mobile phones and other shooting equipment, and may realize remote photography, video, focus and other functions.

Referring to FIGS. 2 and 12, a sidewall of the first bracket 200 may comprise of a cold shoe 7. The cold shoe 7 may enable an external microphone, fill light, bracket, and so on to be mounted onto the multi-directional tripod. Thereby, enriching the product function and the shooting experience.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and process or method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A multi-directional tripod, comprising:
  a gimbal assembly; and
  a support foot assembly, wherein:
  the gimbal assembly comprises a gimbal, wherein:
    a bottom portion of the gimbal defines a through hole;
    the through hole is configured to receive a shaft; and
    the shaft is configured to couple the gimbal assembly with the support foot assembly;
  the gimbal assembly and the support foot assembly are configured to rotate relative to each other; and
  the gimbal is configured to receive a turntable, wherein the turntable defines a shaft hole extending along a center of the turntable, wherein a diameter of the shaft hole is greater than a diameter of a hinge, wherein a top surface of the turntable defines:
    a limit slot, wherein:
      an upper part of the limit slot is provided with a mounting screw;
      the mounting screw is threaded through the limit slot and the hinge; and
      the limit slot receives at least a portion of a head of the mounting screw; and
    a mounting slot, wherein:
      the mounting slot defines at least one threaded hole;
      the mounting slot is configured to receive at least one mounting plate connected to an external screw;
      the mounting plate defines at least one hole;
      the at least one hole corresponds to the at least one threaded hole defined in the mounting slot;
      the mounting plate is fixed in the mounting slot by at least one first screw; and
      the external screw is surrounded by an anti-slip pad, wherein a bottom surface of the anti-slip pad is bonded with the top surface of the turntable.

2. The multi-directional tripod according to claim 1, wherein:
  the shaft is configured to rotate along a circumference of the shaft;
  a top surface of the gimbal comprises of the hinge; and
  an upper end of the hinge defines a threaded hole.

3. The multi-directional tripod according to claim 1, wherein
  the turntable comprises of a threaded through hole, wherein:
    a longitudinal axis of the threaded through hole is perpendicular to a longitudinal axis of the shaft hole; and
    the threaded through hole is defined through a side wall of the turntable.

4. The multi-directional tripod according to claim 3, wherein a wrench is disposed on one side of the turntable, wherein:
  a threaded portion is defined on one end of the wrench;
  the threaded portion is configured to engage with the threaded through hole; and
  a limiter circlip is connected to the wrench, wherein the limiter circlip is positioned inside the sidewall of the turntable.

5. The multi-directional tripod according to claim 4, wherein the shaft comprises of:
  a first end and a second end, wherein a square limit block is defined at the first end; and
  the first end and the second end of the shaft are provided with threaded holes.

6. The multi-directional tripod according to claim 5, wherein:
  the bottom portion of the gimbal comprises a first limit block on one side;
  a rotatory limit groove is defined on a side away from the first limit block;
  a rotary block is disposed on the shaft; and
  a second limit block is disposed towards the second end of the shaft, wherein:
    the shaft is configured to pass through the through hole; and
    the rotary limit groove is configured to receive the rotating block.

7. The multi-directional tripod according to claim 6, wherein the support foot assembly comprises of a first support foot and two second support feet, wherein:
  the two second support feet are mirror-symmetrical structures;
  the first support foot comprises of a first bracket, wherein the first bracket defines a first mounting cavity towards a top end of the first bracket, wherein the first mounting cavity is a hollow cylindrical structure; and
  the second support foot comprises of a second bracket, wherein the second bracket defines a second mounting cavity towards a top end of the second bracket, wherein the second mounting cavity is provided with a fixed plate.

8. The multi-directional tripod according to claim 7, wherein:
  the fixed plate comprises a fixed ratchet on a side facing towards the shaft;
  the fixed plate defines a second gap, wherein the second gap extends radially outwards from a center of the fixed plate;
  at least one first gap is defined between the second gap and a circumference of the fixed plate; and
  the first mounting cavity and the second mounting cavity are provided with a ratchet assembly, wherein the ratchet assembly comprises two return springs coupled to both ends of the shaft.

9. The multi-directional tripod according to claim 8, wherein:
  the two return springs are disposed on the first end and the second end of the shaft; two movable ratchets are disposed next to the each of the two return springs towards an end away from the through hole;
  the two movable ratchets define a central space, wherein:
    an inner diameter of the central space is less than an outer diameter of the two return springs; and the inner diameter is the central space is greater than an outer diameter of the shaft:

the at least one ratchet from the two movable ratchets disposed towards the first end of the shaft defines a limited block groove, wherein the limited block groove has a similar shape profile as that of the first limit block and the second limit block; and the first limit block and the second limit block are respectively placed in the limit block groove of the respective at least one ratchet from the two movable ratchets.

10. The multi-directional tripod according to claim 9, wherein an inner wall of the first mounting cavity comprises of a cogging groove, wherein:

the cogging groove receives a ratchet block, wherein the ratchet block is provided with plurality of locating teeth along a circumference of the ratchet block;

a square limit groove is defined at a center of the ratchet block, wherein at least one third gap is defined between the square limit groove and the plurality of locating teeth;

the square limit groove is configured to receive the square limit block through the at least one movable ratchet among the two movable ratchets; and a second screw is connected to the first end of the shaft.

11. The multi-directional tripod according to claim 10, wherein:

at least one movable ratchet among the two movable ratchets is configured to connect with the ratchet block under the action of the at least one return spring among the two return springs;

the second end of the shaft passes through the other ratchet among the two movable ratchets, wherein the second end of the shaft is plugged into the second gap of the fixed plate; and a third screw is connected to the second end of the shaft.

12. The multi-directional tripod according to claim 11, wherein:

the other ratchet among the two movable ratchets is coupled to the fixed ratchet via a snap fit under action of the at least one return spring among the two return springs;

a plurality of bracket buttons are disposed on an outside of the first mounting cavity and the second mounting cavity;

each of the plurality of bracket buttons comprises of at least one pressure plate, wherein the at least one pressure plate protrudes on a side facing the first mounting cavity and the second mounting cavity;

a clamp block protrudes at one end of the pressure plate; and each of the at least one first gap and the at least one third gap are configured to receive at least one pressure plate.

13. The multi-directional tripod according to claim 12, wherein two fixed shafts are disposed below the second bracket, wherein:

the fixed shafts are provided with threaded holes;

each of the plurality of second support feet comprises a connecting seat;

a socket hole is defined towards a top end of the connecting seat;

the socket hole is configured to receive at least one of the two fixed shafts;

the threaded holes of the two fixed shafts are configured to receive a fourth screw to fixedly attach the socket hole to each of the two fixed shafts;

the socket hole comprises of meshing teeth, wherein the meshing teeth are disposed on an outside surface of the socket hole; and the meshing teeth of one of the plurality of second support feet is configured to engage with the meshing teeth of the other second support feet among the plurality of second support feet.

14. The multi-directional tripod according to claim 13, wherein:

the first support foot comprises of a first handle, wherein the first handle is rotatably connected to the first bracket; and each of the plurality of second support feet comprises a second handle, wherein the second handle is rotatably connected to the connecting seat, wherein:

the first handle and the first bracket are connected by at least one pin assembly; and the second handle and the connection seat are connected by another pin assembly among the at least one pin assembly.

15. The multi-directional tripod according to claim 14, wherein the at least one pin assembly comprises of:

a latch;

a folding button;

a snap spring, wherein a connected card slot is defined on a portion of the first handle and on a portion of each of the second handles; and a bottom side of the first bracket and a bottom side of the connecting seat defines a counterbore.

16. The multi-directional tripod according to claim 15, wherein:

the counterbore on the connecting seat defines a waist hole, wherein the waist hole extends downward and perpendicular to an axis passing through a center of the counterbore;

the snap spring is disposed inside the counterbore;

one end of the latch is disposed inside the connected card slot and the other end is fixed to the folding button; and the counterbore is configured to receive the folding button pressing against the snap spring.

17. The multi-directional tripod according to claim 16, wherein:

a bottom portion of the first handle is rotatably connected with a first universal wheel; and the second handle, rotatable at a bottom portion, is connected with a second universal wheel.

18. The multi-directional tripod according to claim 17, wherein the first bracket is provided with a magnetic groove, wherein:

an inner wall of the magnetic groove is provided with a magnetic block;

the magnetic groove is connected to a Bluetooth controller;

the Bluetooth controller is provided with a magnetic block inside; and one side of the first bracket is fixed with a cold shoe by screws.

19. The multi-directional tripod according to claim 1, wherein:

a bottom outer wall of the turntable is provided with a triangular indicator marker; and a top outer wall of the gimbal is provided with an angle digital identification.

* * * * *